US012516703B2

(12) United States Patent
Binder et al.

(10) Patent No.: US 12,516,703 B2
(45) Date of Patent: Jan. 6, 2026

(54) ELECTROMAGNETIC CLUTCH AND METHOD OF CLOSING AND OPENING AN ELECTROMAGNETIC CLUTCH

(71) Applicant: Hoerbiger Antriebstechnik Holding GmbH, Schongau (DE)

(72) Inventors: Juergen Binder, Schongau (DE); Peter Echtler, Schongau (DE); Andreas Dempfle, Schongau (DE); Werner Fuerguth, Schongau (DE); Wolfgang Voelk, Schongau (DE); Oleg Butorin, Schongau (DE); Sebastian Kucharek, Schongau (DE); Martin Sedlmair, Schongau (DE)

(73) Assignee: Hoerbiger Antriebstechnik Holding GmbH, Schongau (DE)

( * ) Notice: Subject to any disclaimer, the term of this patent is extended or adjusted under 35 U.S.C. 154(b) by 0 days.

(21) Appl. No.: 18/639,231

(22) Filed: Apr. 18, 2024

(65) Prior Publication Data

US 2024/0352979 A1    Oct. 24, 2024

(30) Foreign Application Priority Data

Apr. 18, 2023 (DE) .......................... 102023109684.2

(51) Int. Cl.
*F16D 27/118* (2006.01)
*F16D 11/00* (2006.01)
*F16D 27/00* (2006.01)

(52) U.S. Cl.
CPC ...... *F16D 27/118* (2013.01); *F16D 2011/008* (2013.01); *F16D 2027/007* (2013.01)

(58) Field of Classification Search
CPC .. F16D 27/09; F16D 27/118; F16D 2027/007; F16D 2011/006; F16D 2011/008; F16D 11/14
USPC ........................ 192/84.92, 69.9, 69.91, 114 T
See application file for complete search history.

(56) References Cited

U.S. PATENT DOCUMENTS

| 2,535,388 | A | * | 12/1950 | Burks | F16D 11/10 |
| | | | | | 192/48.91 |
| 2,969,134 | A | | 1/1961 | Wiedmann et al. | |
| 5,827,148 | A | * | 10/1998 | Seto | B60W 10/04 |
| | | | | | 74/336 R |
| 9,816,569 | B2 | | 11/2017 | Funato et al. | |
| 2021/0190150 | A1 | | 6/2021 | Trinkenschuh et al. | |

(Continued)

FOREIGN PATENT DOCUMENTS

DE    102017204113 A1    9/2018

*Primary Examiner* — Richard M Lorence
(74) *Attorney, Agent, or Firm* — McNees Wallace & Nurick

(57) ABSTRACT

An electromagnetic clutch is provided, which includes a shifting sleeve having a first toothing arranged in a rotationally fixed manner on a first shaft and can be displaced linearly along the first shaft between an engaged and a disengaged state, a first clutch body, which has a second toothing and which is aligned coaxially to the first shaft, the first and/or the second toothing having undercuts in the direction of the engaged state, which are configured such that a torque transmission between the first shaft and the first clutch body generates a force on the shifting sleeve in the direction of the engaged state. Also included is a method of closing and opening an electromagnetic clutch.

18 Claims, 10 Drawing Sheets

(56) References Cited

U.S. PATENT DOCUMENTS

2023/0086003 A1* 3/2023 Binder .................... F16D 11/14
                                                                192/69
2024/0376941 A1* 11/2024 Binder .................... F16D 23/14

* cited by examiner

ELECTROMAGNETIC CLUTCH AND METHOD OF CLOSING AND OPENING AN ELECTROMAGNETIC CLUTCH

TECHNICAL FIELD

The disclosure relates to an electromagnetic clutch and to a method of closing and opening an electromagnetic clutch.

BACKGROUND

The term "electromagnetic clutch" is intended to refer to the fact that the clutch is actuated electromagnetically. However, torque transmission when the clutch is closed can take place by a positive and/or frictional engagement.

Clutches are typically used if torque is to be temporarily transmitted from one shaft to another shaft aligned coaxially thereto, without these two shafts being permanently connected. A distinction is made here between frictional and positive clutches. The present disclosure is limited to positive clutches.

Sliding coupling sleeves are often used for positive clutches. These have one or more different toothings which engage in mating toothings so that a positive fit is produced via which torque can be transmitted from one shaft to another.

Electromagnetic clutches are known from the prior art, in which the displacement of the sliding coupling sleeve takes place via a coil which exerts a magnetic force on the coupling sleeve. The shifting travel along which the sliding coupling sleeve can be displaced by the magnetic forces is limited. This is due to the fact that the magnetic forces which can be applied to the coupling sleeve decrease with increasing distance from the coil. This means that the shifting sleeve can only be displaced along a certain section via the magnetic force of the coil, and therefore the axial overlap of the toothing and the mating toothing is limited accordingly.

However, in addition to the design of the toothing itself, the axial overlap of the toothings is largely responsible for the maximum torque which can be transmitted by the coupling between two shafts. Consequently, the transmittable torque of an electromagnetic clutch is limited due to the limited shifting travel of the shifting sleeve.

If the shifting travel and thus the axial overlap of the toothing is to be increased, this inevitably involves the use of larger coils.

The disadvantage is that the use of larger coils increases the installation space required and the material costs. In addition, the use of larger coils is also associated with an increase in the weight of the electromagnetic clutch. This has a particularly negative effect when the electromagnetic clutch is used in vehicles.

Against this background, it is the object of the disclosure to provide an electromagnetic clutch in which the greatest possible axial overlap of the toothings can be realized despite the limited magnetic shifting travel of the shifting sleeve. This is to be achieved without using a larger coil and without significantly increasing the weight of the electromagnetic clutch.

SUMMARY

The disclosure suggests an electromagnetic clutch comprising a shifting sleeve which has a first toothing, is arranged in a rotationally fixed manner on a first shaft and can be displaced linearly along the shaft between an engaged and a disengaged state, a first clutch body, which has a second toothing and which is aligned coaxially to the first shaft, a stator, which comprises a first coil which serves for the direct or indirect displacement of the shifting sleeve linearly along the shaft, wherein the first and/or the second toothing has/have undercuts in the direction of the engaged state, which are configured such that a torque transmission between the shaft and the first clutch body generates a force on the shifting sleeve in the direction of the engaged state, and wherein, in the engaged state, there is a positive fit due to the first and the second toothing between the shifting sleeve and the first clutch body.

The basic idea of the disclosure is that the shifting sleeve can be displaced from the disengaged state to the engaged state by means of the first coil, thus producing a positive fit between the first and the second toothing, as there is already a still reduced axial overlap of the toothings in the axial direction.

If torque is transmitted between the first shaft and the clutch body, the first and/or the second toothing generate a force due to the undercuts, which acts on the shifting sleeve in the direction of the engaged state.

As a result, the shifting sleeve is moved further in the direction of the engaged state from a certain force. It is thus possible to realize a shifting travel which would not be possible by a displacement via the first coil alone. Consequently, the shifting sleeve is "pulled" towards the engaged state in the engaged state when torque is transmitted through the first and/or the second toothing provided with undercuts.

The additional displacement of the shifting sleeve during torque transmission is accompanied by an increase in the axial overlap of the first and the second toothing, so that higher torques can be transmitted.

The total shifting travel of the shifting sleeve is therefore divided into a first shifting travel, which takes place by means of the coil, and a second shifting travel, which is caused by the undercuts of the first and/or second toothing in conjunction with an acting torque.

This configuration allows a simple structure to be able to realize higher shifting travels and a larger axial overlap of the toothings without changing the dimensions of the coil or increasing the air gap between the armature and the stator.

One aspect provides that the first coil serves for direct or indirect displacement of the shifting sleeve linearly along the first shaft into the engaged state, and that the stator comprises a second coil, which serves for direct or indirect displacement of the shifting sleeve linearly along the first shaft in the direction opposite to the engaged state. In addition or as an alternative to the second coil, a spring return may be provided which applies a spring force to the shifting sleeve linearly along the first shaft in the direction opposite to the engaged state.

It is also conceivable that, depending on the shifting direction, both coils are used to displace the shifting sleeve into the engaged and the disengaged state.

Furthermore, when the shifting sleeve is displaced into the engaged state by means of the first coil, there may be an axial overlap between the first and the second toothing, and the undercuts can shift the shifting sleeve towards the engaged state when torque is transmitted.

Due to the additional displacement of the shifting sleeve towards the engaged state, the axial overlap of the first and the second toothing increases in accordance with the previous explanations, which is greater than if the shifting sleeve is displaced into the engaged state solely by the coil.

Optionally, the first and/or the second toothing provided with undercuts may have teeth the tooth flanks of which are wedge-shaped at least along a section of the tooth in a plan view.

The wedge shape enables a simple design of the undercuts and still ensures that the teeth of the toothings are supported in a flat manner against each other, provided that the tooth flanks of the teeth are adjusted to each other.

Due to a wedge shape of the teeth, which is only present in sections, it can for example be achieved that when the shifting sleeve additionally moves towards the engaged state when torque is transmitted and the maximum overlap of the toothings is reached, further sections are provided along the teeth, which lie flat on opposite surfaces of the teeth of the mating toothing.

In this way, a high axial overlap and at the same time a flat rest of the teeth of the toothings can be achieved.

Optionally, the first and the second toothing have undercuts, the tapered ends of the wedge-shaped sections of the first and the second toothing extending in opposite directions.

If both toothings have wedge-shaped sections, the tooth flanks of the toothings can be adapted to each other so that the wedge-shaped sections are present over a flat surface.

An armature may be provided which is coupled to the shifting sleeve and can be displaced along the first shaft by energizing the first and/or the second coil, the armature and the shifting sleeve being coupled so as to be displaceable relative to each other in the axial direction.

Consequently, a displacement of the armature by means of the first and/or the second coil along the first shaft also results in a displacement of the shifting sleeve. Nevertheless, a relative movement between the armature and the shifting sleeve is not excluded.

Furthermore, the material for the shifting sleeve can be selected and treated independently of the magnetic properties thereof. For example, torque-transmitting components can be hardened without having to take the magnetic properties of the shifting sleeve into account.

Furthermore, all torque-transmitting components may also be magnetically decoupled from the armature.

Furthermore, this design allows extremely small gap dimensions between the armature and the stator, as a result of which particularly high switching forces can be realized.

The displacement of the armature by at least one of the coils can be limited by a stop, which is in particular provided on the clutch body to avoid contact with the stator, wherein when the armature rests against the stop when the coil is energized, a magnetic holding force can be present which acts on the armature.

This results in a high magnetic holding force even when the coil is only slightly energized.

As a result, the power loss when holding the armature at the stop can be significantly reduced by lowering the current intensity without the armature unintentionally detaching from the stop.

The armature and the shifting sleeve can be coupled in the axial direction via at least one elastic spring unit which deflects when the shifting sleeve and the armature are displaced axially relative to each other.

The spring unit therefore allows a relative movement between the shifting sleeve and the armature. At the same time, it deflects so that a spring force is produced which moves the shifting sleeve and the armature back into the initial relative position.

In addition, at least one spring unit can be arranged such that when the first and the second teeth are in contact on an end face and the shifting sleeve is not yet coupled to the first clutch body, the spring unit pretensions the shifting sleeve in the direction of the engaged state.

This has the additional advantage that as soon as the toothings rotate relative to each other, the shifting sleeve performs an accelerated movement towards the first clutch body and the toothings engage with each other.

Optionally, the armature may have a first axial abutment surface and the shifting sleeve may have a second axial abutment surface, and the elastic spring unit may be supported in the axial direction on the first and the second axial abutment surfaces.

This allows the spring unit to be supported uniformly between the armature and the shifting sleeve, so that any spring forces that may prevail also act uniformly on the shifting sleeve and the armature and tilting of the components is prevented.

The armature may have a radial web on which the first axial abutment surface is provided. A web offers a particularly simple realization for an abutment surface and is also stable.

The first spring unit may be present on an axial side of the web and a second spring unit may be present on the opposite side of the web, at least one of the spring units exerting a restoring force in the event of a relative displacement of the armature and the shifting sleeve.

This ensures that the armature and the shifting sleeve are coupled in both axial directions via the spring units, and that a restoring force is exerted by at least one spring unit when the spring units are preloaded and the armature and the shifting sleeve move relative to each other.

If the shifting sleeve is therefore in the engaged state and a torque is also applied, the elastic spring units still allow a relative displacement between the armature and the shifting sleeve.

As soon as the torque application is reduced or no longer present, the restoring forces of at least one of the spring units cause the shifting sleeve to move relative to the armature back to its initial state.

The spring units may be accommodated in spaces which are delimited radially on the inside by a shifting sleeve bushing and radially on the outside by the armature and on one end face by the web and on the opposite end face by a toothed wheel firmly connected to the shifting sleeve bushing, wherein the toothed wheel has the first toothing and engages in the second toothing provided on the first clutch body in the engaged state.

The accommodation of the spring units in spaces ensures that they are guided on all sides. Furthermore, this ensures that when the shifting sleeve moves relative to the armature in one of the two axial directions, at least one of the spring units is always compressed and exerts a restoring force.

The at least one spring unit can be at least one wave ring or a diaphragm spring or comprises an assembly thereof.

Both diaphragm springs and wave springs are particularly suitable, as they act uniformly along the entire circumference on the two axial abutment surfaces when they are preloaded or compressed.

Furthermore, at least one spring unit may be arranged such that when the shifting sleeve is not yet coupled to the clutch body, this spring unit is preloaded to exert a spring force on the shifting sleeve in the direction of the engaged state. If necessary, the spring unit can pretension the shifting sleeve in the direction of the engaged state when the teeth abut head to head. The displacement force is transferred from the armature to the shifting sleeve via the spring unit, and the spring unit deflects when the shifting sleeve provides a sufficiently high resistance so that the spring unit then presses permanently against the shifting sleeve in the direction of the engaged state. When the toothings initially abut head to head, the spring unit presses the shifting sleeve into the toothing on the clutch body as soon as a tooth gap is reached.

The at least one spring unit may be arranged such that, when the shifting sleeve is coupled to the first clutch body, this spring unit is preloaded to exert a spring force on the shifting sleeve in the direction of the disengaged state. This means that the shifting sleeve is preloaded in the direction of the disengaged state. The spring force therefore permanently supports the disengagement process, even if the armature has not yet been moved.

A spring detent may also be provided, which serves to exert a holding force on the shifting sleeve in the engaged and/or the disengaged state.

It is thus possible that the coils do not have to be activated, for example, if the armature together with the shifting sleeve is to be held in the disengaged state.

Furthermore, when the armature is moved together with the shifting sleeve towards the engaged state, this also allows the spring detent to exert a holding force on the shifting sleeve in the engaged state as soon as the armature has reached the stop, or as soon as the shifting sleeve is additionally moved further towards the engaged state by a torque load.

According to an option, a second clutch body may be provided, which is aligned coaxially to the first shaft and is provided on the axial side of the shifting sleeve opposite the first clutch body, and which can be coupled to the shifting sleeve by actuating the second coil, the toothing of the second clutch body and the associated toothing of the shifting sleeve being formed like the toothing of the first clutch body and the associated toothing thereof.

The shifting sleeve can therefore be shifted from the initial state into two different engaged states, so that torque can also be transmitted between the first shaft and the second clutch body.

For example, when moving the shifting sleeve into the engaged state with the second clutch body, the spring units can act on the shifting sleeve before and after engagement in the direction of the engaged state or the disengaged state, as already explained above.

The corresponding advantages result from the above explanations.

The object initially mentioned is also achieved by a method of closing and opening an electromagnetic clutch, in particular an electromagnetic clutch according to the disclosure in accordance with the above explanations, comprising an armature and a shifting sleeve coupled thereto, which has a first toothing, is arranged in a rotationally fixed manner on a first shaft and can be displaced linearly along the first shaft between an engaged and a disengaged state, a first clutch body having a second toothing, which is aligned coaxially to the first shaft, a first coil, which serves to displace the shifting sleeve linearly along the first shaft into the engaged state, and a second coil, which serves to displace the shifting sleeve linearly along the first shaft against the engaged state, comprising the following steps:

a) applying voltage to the first coil and generating a magnetic force acting on the armature towards the first clutch body;
b) displacing the armature and entraining the shifting sleeve by means of the armature from a disengaged state in the direction of the engaged state with the interposition of a spring unit between the armature and the shifting sleeve;
c) moving the shifting sleeve into the engaged state of the shifting sleeve and forming a positive fit between the shifting sleeve and the first clutch body by means of the first and the second toothing, the first and the second toothing having a first axial overlap with respect to each other;
d) transmitting a torque between the first clutch body and the first shaft and displacing the shifting sleeve relative to the armature towards the first clutch body, the first and the second toothing having a second axial overlap with respect to each other, which exceeds the amount of the first one;
e) canceling or reducing the transmitted torque between the first clutch body and the first shaft and displacing the shifting sleeve relative to the armature away from the first clutch body, the first and the second toothing having the first axial overlap with respect to each other;
f) canceling or reducing the magnetic force acting on the armature by the first coil;
g) applying voltage to the second coil and generating a magnetic force acting on the armature; and
h) displacing the armature and entraining the shifting sleeve by means of the armature from an engaged state to the disengaged state.

The first coil is therefore energized first so that the armature moves the shifting sleeve from the disengaged state to the engaged state. The coupling between the armature and the shifting sleeve takes place via spring units, which are optionally preloaded by the movement of the armature, so that the displacement of the armature is accompanied by a practically direct displacement of the shifting sleeve.

It is possible that the first and the second toothing lie on top of each other and the toothing of the shifting sleeve does not directly engage the toothing of the clutch body.

As a result, the armature moves towards the clutch body due to the magnetic force, while movement of the shifting sleeve is not possible due to the toothings contacting each other on the end face. There is therefore a relative movement between the armature and the shifting sleeve, which compresses and thus pretensions at least one of the spring units.

If the shifting sleeve rotates relative to the clutch body, the shifting sleeve is accelerated due to the preloaded spring so as to move into the engaged state and form a positive fit with the clutch body. The toothings have a first axial overlap with each other.

This positive fit allows the transmission of a torque between the clutch body and the first shaft, which results in the shifting sleeve moving further towards the clutch body relative to the armature and the axial overlap of the toothings increasing, so that an additional torque can be transmitted.

In addition, this relative movement between the shifting sleeve and the armature also causes compression in the axial direction of at least one spring unit.

As a result, the restoring force which thus builds up displaces the shifting sleeve relative to the armature back to its initial position as soon as the torque transmitted between the first shaft and the clutch body is sufficiently reduced or canceled.

The shifting sleeve is therefore still in the engaged state. However, the overlap of the toothing decreases to the initial overlap. To move the armature together with the shifting sleeve back into the disengaged state, the magnetic force acting through the first coil must first be reduced or eliminated. In addition, the second coil must be energized so that a magnetic force acts towards the disengaged state, which moves the armature and the shifting sleeve axially along the first shaft.

BRIEF DESCRIPTION OF THE DRAWINGS

The disclosure will be described below with reference to one embodiment shown in the accompanying drawings, in which.

DETAILED DESCRIPTION

Figure 1:
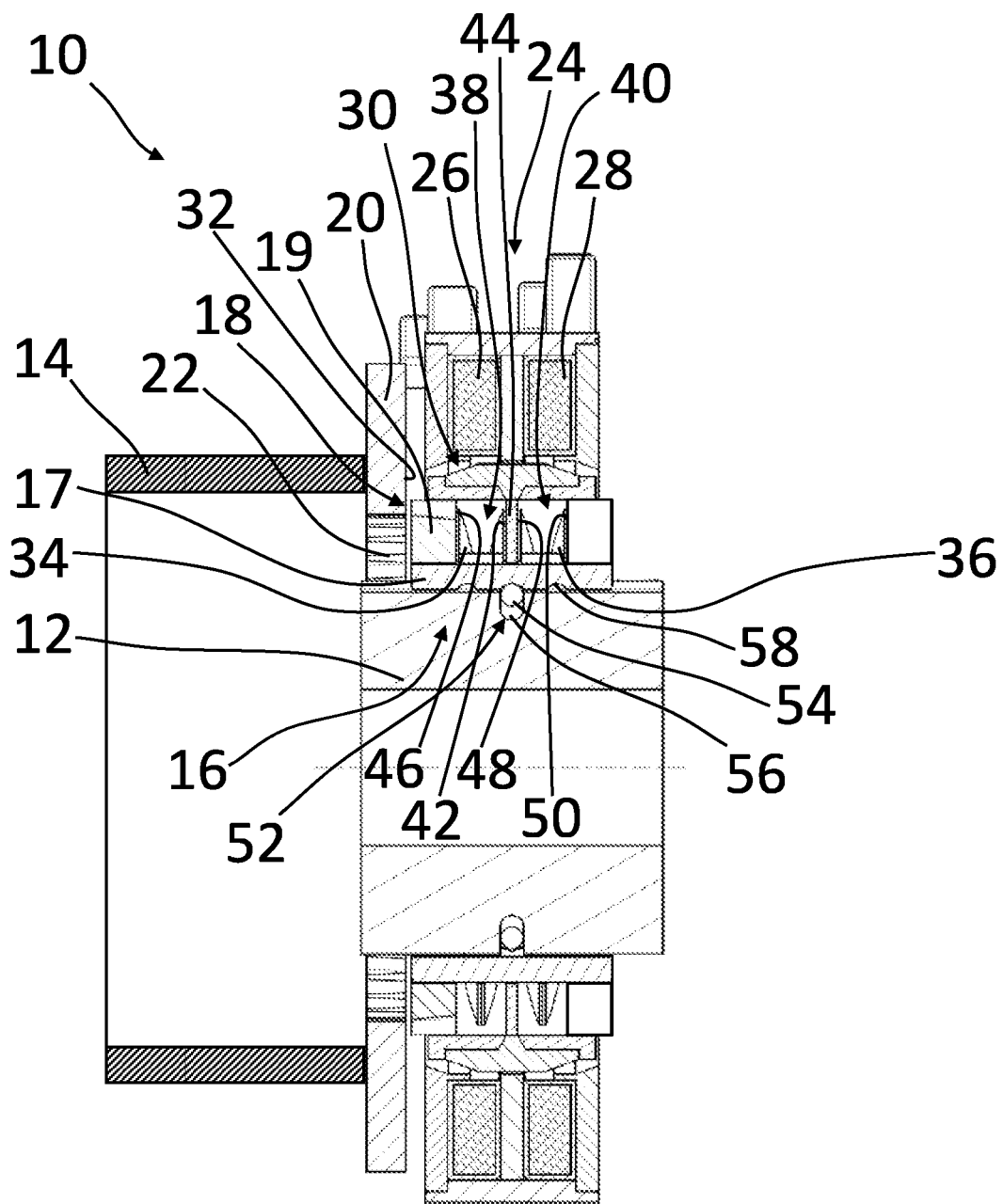
FIG. 1 shows a sectional view of an electromagnetic clutch according to the disclosure with a shifting sleeve in the disengaged state.

FIG. 1 shows an electromagnetic clutch 10 which serves to couple a first shaft 12 and a second shaft 14 coaxially aligned to the first shaft 12 to each other by opening and closing.

The electromagnetic clutch 10 comprises a shifting sleeve 16 having a shifting sleeve bushing 17 and a first toothing 18. The toothing 18 radially on the outside of the circumference is provided on a toothed wheel 19 which is connected in a rotationally fixed manner to the shifting sleeve bushing 17.

Alternatively, the shifting sleeve 16 can also be designed as a single piece.

Furthermore, the shifting sleeve 16 is arranged in a rotationally fixed manner on the first shaft 12 and can be displaced linearly along the latter between an engaged and a disengaged state. FIG. 1 shows the shifting sleeve 16 in the disengaged state.

A first clutch body 20 is associated with the second shaft 14.

The clutch body 20 has a second toothing 22, here an internal toothing, and is coupled to the second shaft 14 in a rotationally fixed manner, so that the clutch body 20 is aligned coaxially to the first shaft 12.

However, it is also conceivable that the first clutch body 20 forms part of the second shaft 14 and is formed in one piece therewith.

The clutch body 20 comprises at least one annular section, and the second toothing 22 runs along the radial inside of the annular section.

The first and the second toothing 18, 22 of the shifting sleeve 16 and the first clutch body 20 are positioned at the ends of the shafts 12, 14.

Figure 2:
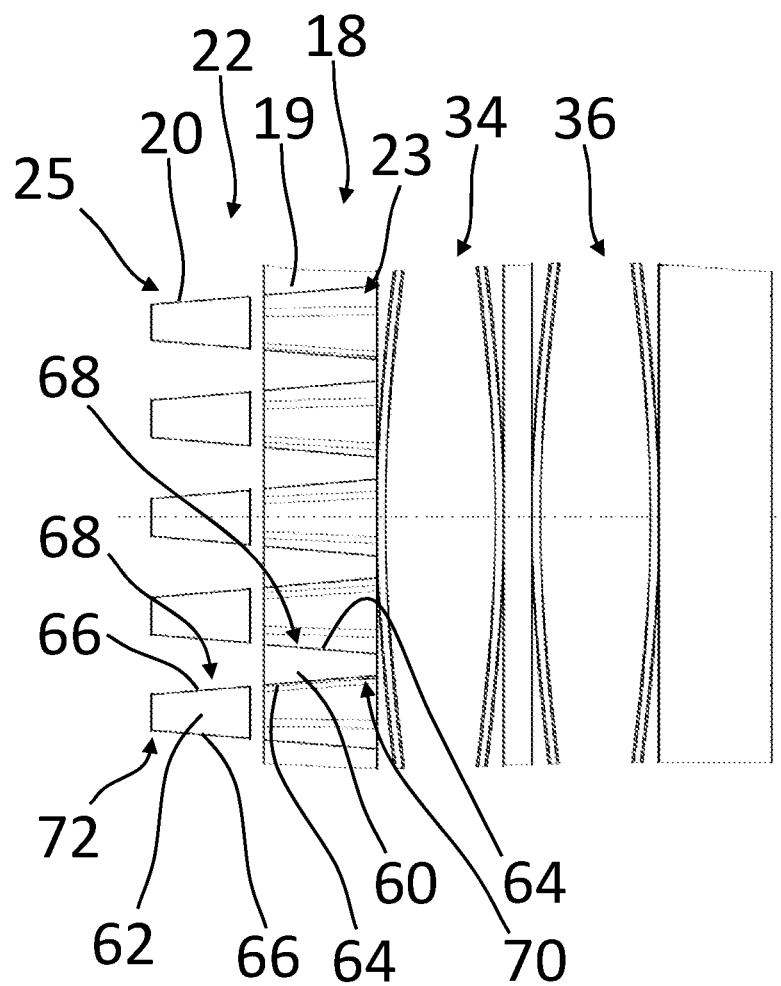
FIG. 2 shows a schematic top view of toothings of the electromagnetic clutch according to the disclosure from FIG. 1 with the shifting sleeve in the disengaged state.
Figure 3:
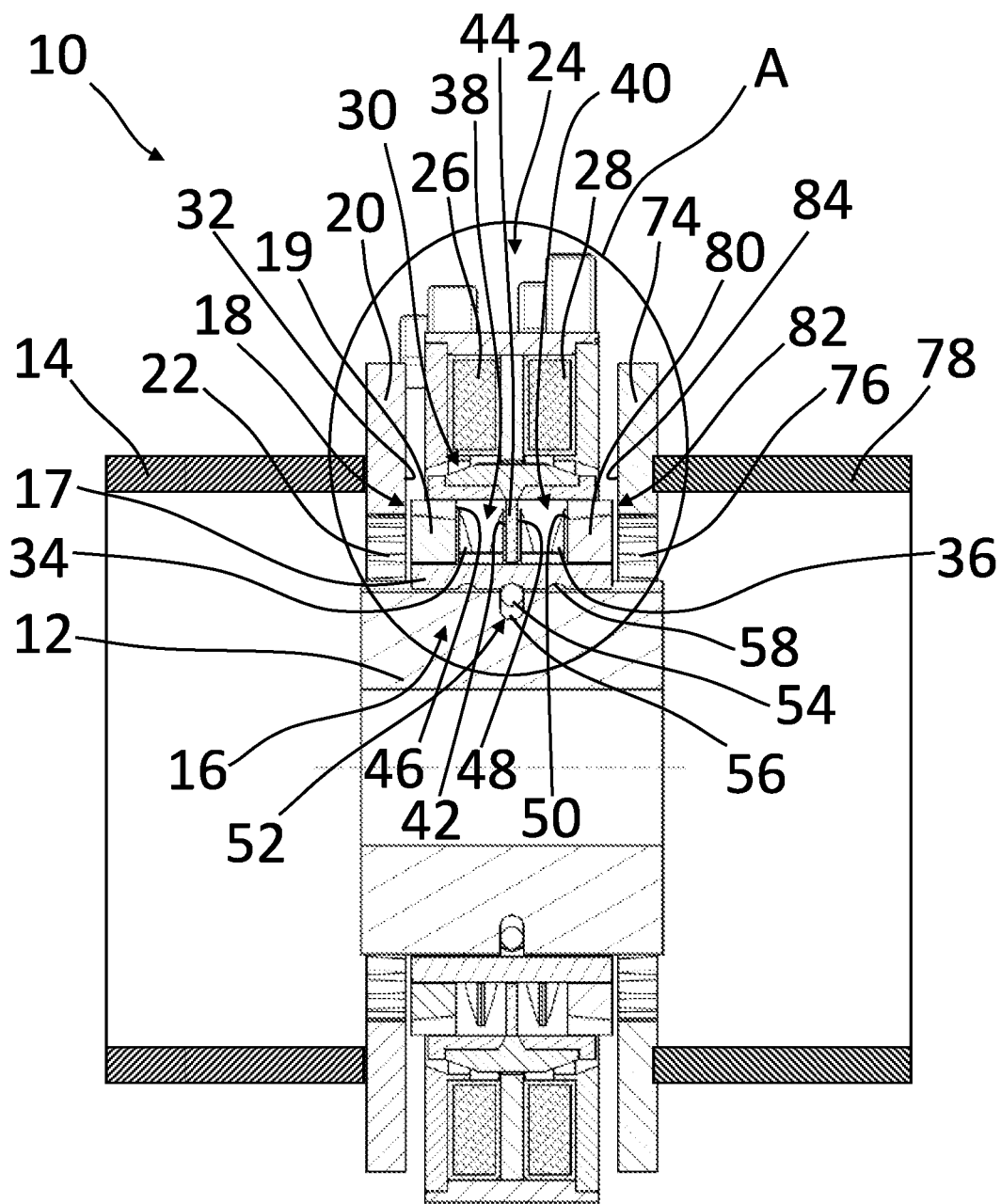
FIG. 3 shows a sectional view of a further electromagnetic clutch according to the disclosure with a shifting sleeve in the disengaged state according to a second option.

As shown in FIG. 2, both the first and the second toothing 18, 22 each have undercuts 23 and 25 when viewed in the axial direction.

Alternatively, it is also conceivable that only one of the toothings 18, 22 is provided with undercuts.

The first and the second toothing 18, 22 serve to form a positive fit between the shifting sleeve 16 and the first clutch body 20 when the shifting sleeve 16 is in the engaged state.

A stator 24, which comprises a first coil 26 and a second coil 28, is provided for displacing the shifting sleeve 16 between the engaged and the disengaged state.

The first coil 26 serves to displace the shifting sleeve 16 linearly along the first shaft 12 into the engaged state (to the left in FIG. 1), and the second coil 28 serves to displace the shifting sleeve 16 linearly along the first shaft 12 in the opposite direction to the engaged state, i.e. away from the first clutch body 20.

In addition or as an alternative to the second coil 28, a spring may also be provided (not shown in the figures), which applies a spring force to the shifting sleeve 16 linearly along the first shaft 12 in the direction opposite to the engaged state.

The shifting sleeve 16 can be displaced directly by the first and the second coil 26, 28 by the coils 26, 28 exerting a magnetic force directly on the shifting sleeve 16 itself.

Alternatively, as shown in FIG. 1, an armature 30 coupled to the shifting sleeve 16 in the axial direction can additionally be provided. The shifting sleeve 16 is displaced indirectly via the armature 30. The armature 30 can therefore be displaced along the first shaft 12 by energizing the first or the second coil 26, 28 and can entrain the shifting sleeve 16.

To prevent magnetic leakage fluxes, the armature 30 can be magnetically decoupled from the shifting sleeve 16.

This can be achieved, for example, by coating the shifting sleeve 16 with a plastic material, at least in the area towards the armature 30. Alternatively, it is also possible to select a non-ferromagnetic material for the shifting sleeve 16.

Furthermore, a stop 32 can be provided, which is provided on the first clutch body 20 and limits the displacement of the armature 30 by the first coil 26 in the direction of the first clutch body 20.

Furthermore, a first elastic spring unit 34 and a second elastic spring unit 36 are provided, via which the armature 30 and the shifting sleeve 16 are coupled so as to be displaceable relative to each other in the axial direction.

The elastic spring units 34, 36 are arranged between the armature 30 and the shifting sleeve 16 such that a relative displacement in the axial direction results at least in the deflection of one of the spring units 34, 36.

Alternatively, a configuration in which only one spring unit is used is also conceivable.

The first elastic spring unit 34 and the second elastic spring unit 36 are accommodated in spaces 38, 40.

Both of the spaces 38, 40 are delimited radially on the inside by the shifting sleeve 17. Radially on the outside, the two spaces 38, 40 are defined by the armature 30.

In the axial direction, the space 38 for the spring unit 34 is limited by a first axial abutment surface 42, which is provided on a radial web 44 of the armature 30. Furthermore, the space 38 is delimited on the side opposite to the first axial abutment surface 42 by a second axial abutment surface 46.

The second axial abutment surface 46 is provided on the end face of the toothed wheel 19.

Consequently, the first elastic spring unit 34 is supported in the axial direction on the first axial abutment surface 42 and the second axial abutment surface 46 and can optionally be preloaded between the axial abutment surfaces 42, 46.

The space 40 is defined by a third axial abutment surface 48 provided on the side of the web 44 opposite to the second axial abutment surface 46, and by a fourth axial abutment surface 50 provided on the shifting sleeve 16.

The second elastic spring unit 36 is supported in the axial direction on the third axial abutment surface 48 and the fourth axial abutment surface 50. Optionally, it can also be preloaded between the abutment surfaces 48, 50.

Both of the spring units 34, 36 each comprise at least one wave ring. Alternatively, they can also each comprise an assembly of several wave rings.

Alternatively, it is also conceivable that each of the spring units 34, 36 comprises a diaphragm spring or a diaphragm spring assembly.

Instead of the two elastic spring units 34, 36, it is also conceivable to configure the electromagnetic clutch with only the first elastic spring unit 34 or only the second elastic spring unit 36.

In addition, the electromagnetic clutch 10 can comprise a spring detent 52 which has a spring ring 54 which is guided within a groove 56 provided on the first shaft 12 and can engage in recesses 58 provided on the shifting sleeve 16, so that the spring detent 52 exerts a holding force on the shifting sleeve 16 in the disengaged state.

In accordance with the above explanations, FIG. 2 shows a detailed view of the first and the second toothing 18, 22 provided with undercuts 23, 25. The first toothing has teeth 60 and the second toothing 22 has teeth 62.

The respective undercuts 23, 25 of the toothings 18, 22 are formed by the wedge-shaped tooth flanks 64 of the teeth 60 and the wedge-shaped tooth flanks 66 of the teeth 62, wedge-shaped sections 68, i.e. gaps, being thus formed.

According to FIG. 2, the respective tooth flanks 64, 66 are wedge-shaped over the entire axial length of the teeth 60, 62. Thus, the wedge-shaped sections 68 correspond to the entire tooth flank.

However, it is also conceivable that the wedge-shaped sections 68 only correspond to part of the entire tooth flank.

Due to the wedge-shaped tooth flanks 64, the teeth 60 have tapered ends 70 and the teeth 62 have tapered ends 72 due to the wedge-shaped tooth flanks 66. The tapered ends 70 run in an opposite direction to the tapered ends 72, so that the ends 70, 72 point in opposite directions.

The tapered ends 70 are arranged on the side of the wedge-shaped section 68 of the first toothing 18 facing away from the clutch body 20, and the tapered ends 72 are arranged on the side of the wedge-shaped section 68 of the second toothing 22 facing away from the shifting sleeve 16.

FIGS. 3 to 10 show the electromagnetic clutch 10 according to a second option. In contrast to the electromagnetic clutch 10 shown in FIG. 1, the electromagnetic clutch 10 according to the second option additionally comprises a second clutch body 74, which is aligned coaxially to the first shaft 12 and is arranged on a third shaft 78.

The second clutch body 74 has a third toothing 76.

In accordance with the previous explanations regarding the first clutch body 20, the second clutch body 74 can also be provided as an independent component on the third shaft 78 or be formed in one piece therewith.

Furthermore, a second toothed wheel 80 is additionally arranged on the side of the shifting sleeve 16 facing the second clutch body 74, the end face of which facing the web 44 forms the fourth axial abutment surface 50. The second toothed wheel 80 is provided with a fourth toothing 82.

In the electromagnetic clutch 10 according to the second option, the shifting sleeve 16 can be displaced directly or indirectly towards the second clutch body 74 via the armature 30 by means of the second coil 28 into an engaged state in which a positive fit is formed by the third toothing 76 and the fourth toothing 82 between the third shaft 78 and the shifting sleeve 16.

In addition, a stop 84 is provided on the second clutch body 74, which limits a displacement of the armature 30.

Furthermore, with regard to the third toothing 76, the explanations regarding the second toothing 22 apply analogously, and with regard to the fourth toothing 82, the above explanations regarding the first toothing 18 apply.

Figure 4:
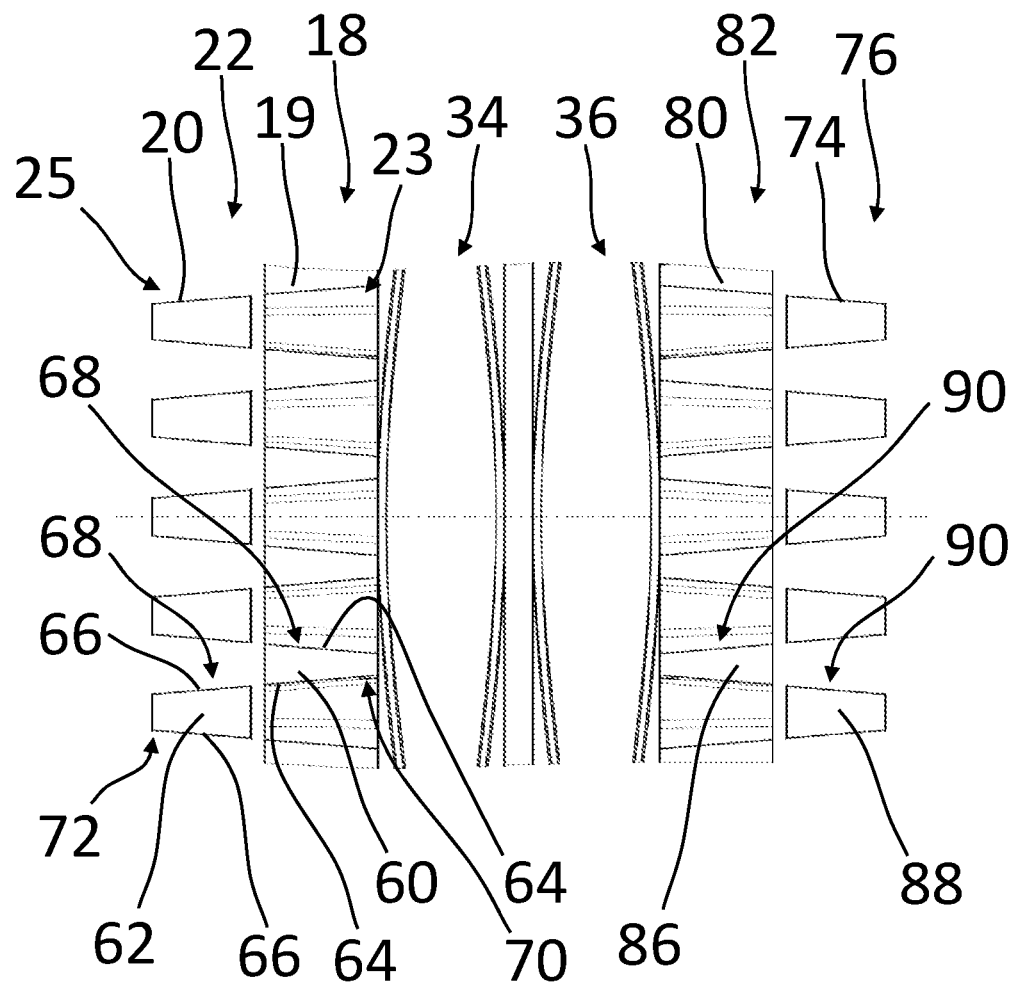
FIG. 4 shows a schematic top view of toothings of the electromagnetic clutch according to the disclosure with the shifting sleeve in the disengaged state according to a second option.

According to FIG. 4, the third and the fourth toothing 76, 82 have teeth 86, 88 which are formed analogously to those of the first and the second toothing 18, 22 and also have undercuts. Consequently, the third and the fourth toothing 76, 82 have wedge-shaped sections 90.

The functional principle and the operation of the electromagnetic clutch 10 will be explained below with reference to FIGS. 4 and 6 to 10. FIGS. 5 to 10 show the electromagnetic clutch 10 according to the second option, but these explanations also apply to the electromagnetic clutch 10 shown in FIGS. 1 and 2.

Furthermore, the function of the electromagnetic clutch is described exclusively on the basis of a coupling of the shifting sleeve 16 with the first clutch body 20. However, the explanations can also be applied equally to a coupling of the shifting sleeve 16 with the second clutch body 74.

Figure 6:
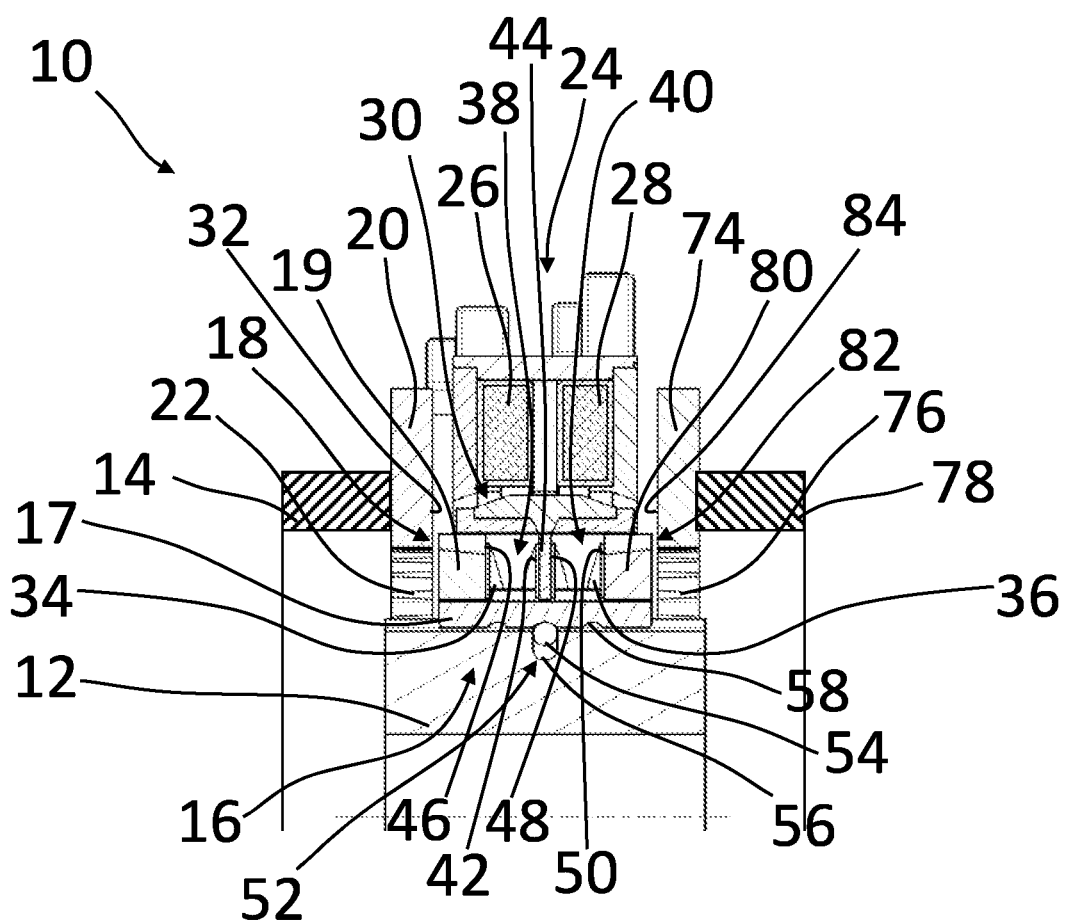
FIG. 6 shows the detail A of the electromagnetic clutch of FIG. 3.

The initial state here is the disengaged state of the shifting sleeve 16, as shown in FIGS. 4 and 6.

There is therefore no positive fit between one of the toothings of the shifting sleeve and the toothings of the clutch bodies 20, 74.

To hold the shifting sleeve 16 in this open state and to ensure that it remains open, the spring detent 52 exerts a holding force on the shifting sleeve in the disengaged state.

Alternatively or additionally, by energizing the first and the second coil 26, 28, the shifting sleeve 16 can exert a holding force in the disengaged state via the armature 30, to which the shifting sleeve is coupled via the elastic spring units 34, 36.

If the shifting sleeve 16 is to be displaced from the disengaged state towards the first clutch body 20, a voltage must be applied to the first coil.

If the shifting sleeve 16 is held in the disengaged state by the first and the second coil 26, 28, the voltage applied to the second coil 28 must also be reduced or removed.

The application of voltage to the first coil 26 produces a magnetic flux, which causes a magnetic force to act on the armature 30 in the direction of the first clutch body 20.

The magnetic force displaces the armature 30, which in turn is coupled to the shifting sleeve 16 via the first and the second elastic spring unit 34, 36. Therefore, a displacement of the armature 30 with preloaded elastic spring units 34, 36 directly results in an entrainment of the shifting sleeve 16.

When the elastic spring units 34, 36 are not preloaded, at least one of the spring units 34, 36 must first be compressed so that a spring force builds up. The spring force which builds up acts on the shifting sleeve 16, so that the shifting sleeve 16 is indirectly moved by the armature 30 via the spring unit as soon as the amount of the spring force exceeds the amount of any possibly acting holding force.

This displacement of the armature 30 towards the first clutch body 20 takes place until the armature 30 reaches the stop 32 provided on the first clutch body 20. When the coil 26 is energized, a magnetic holding force acts on the armature 30.

Figure 7:
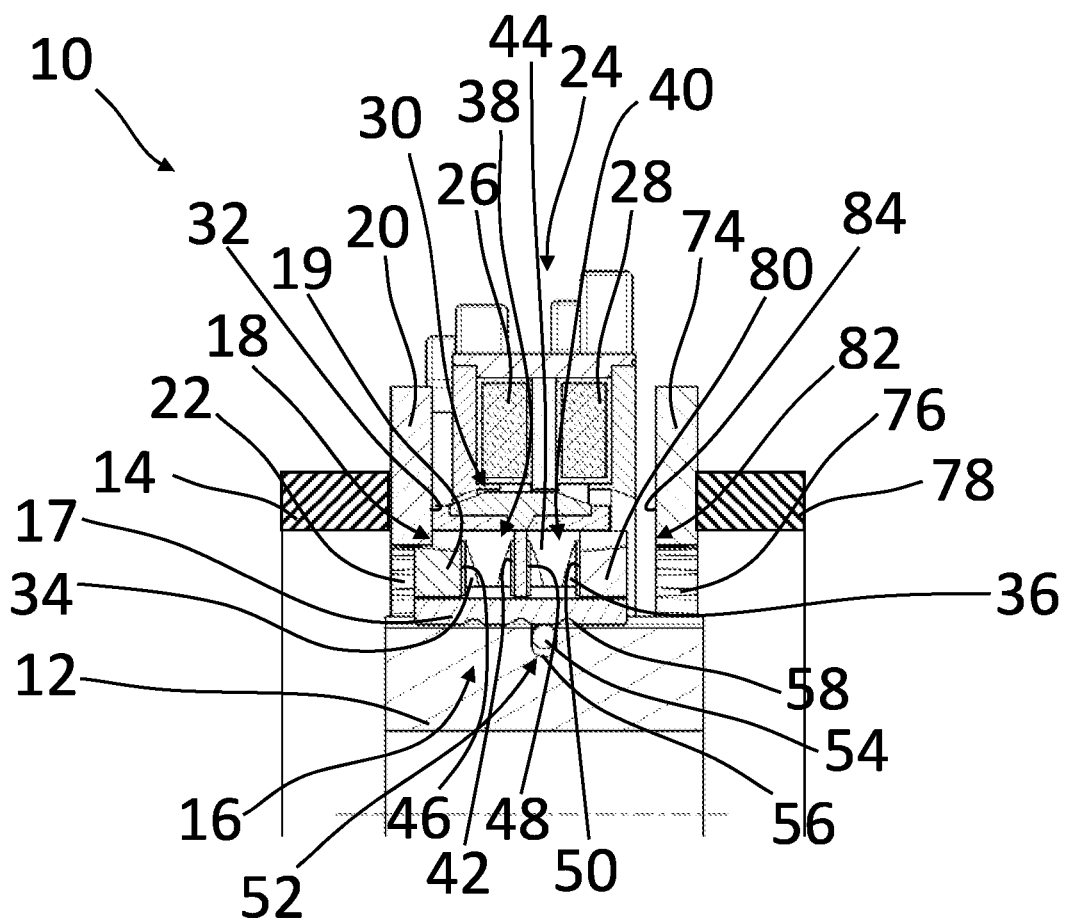
FIG. 7 shows the detail A of the electromagnetic clutch of FIG. 3 with the shifting sleeve in the partially engaged state.
Figure 8:
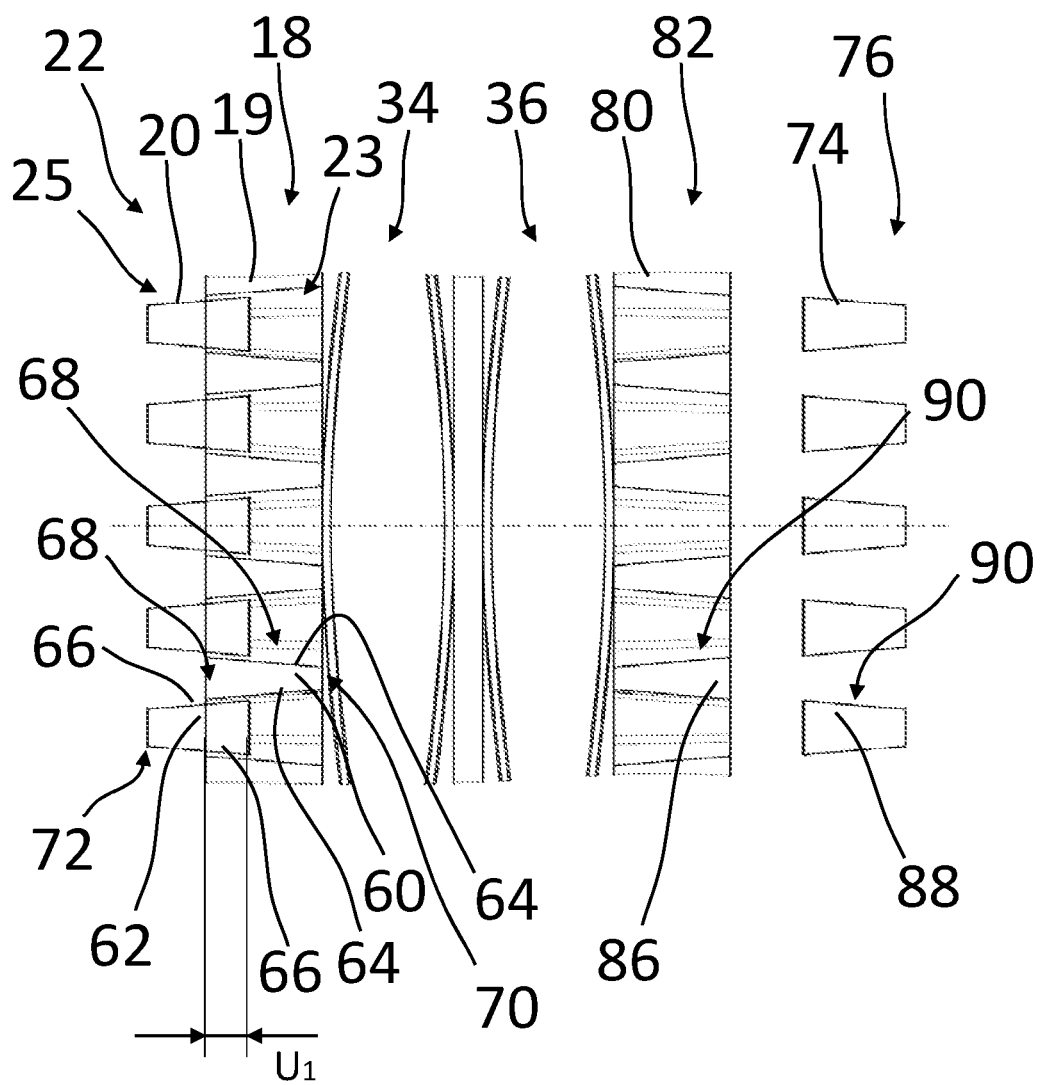
FIG. 8 shows a schematic representation of the toothings of FIG. 4 with the shifting sleeve in the partially engaged state.

The first toothing 18 of the shifting sleeve 16 can engage directly with the second toothing 22 of the first clutch body 20 before reaching the stop 32, so that a positive fit is formed, as shown in FIGS. 7 and 8.

However, it is also possible that the first and the second toothing 18, 22 first come into contact on the end face before the stop 32 is reached. In this case, the toothings 18, 22 therefore lie tooth on tooth, and further axial displacement of the shifting sleeve 16 towards the first clutch body 20 is prevented.

As a result, a relative movement takes place between the shifting sleeve 16, which contacts the end face of the first clutch body 20, and the armature 30, on which a magnetic force still acts, causing it to move further until it reaches stop 32.

As a result, the first spring unit 34 is compressed between the first axial abutment surface 42 and the second axial abutment surface 46, as the dimensions of the space 38 decrease in the axial direction.

At the same time, the space 40 increases in the axial direction, so that the third and the fourth axial abutment surface 48, 50 move away from each other.

Contact between the end faces of the first and the second toothing 18, 22 therefore results in additional pretensioning of the first elastic spring unit 34, so that an additional spring force acts on the shifting sleeve 16 towards the first clutch body 20.

If a relative rotation takes place between the shifting sleeve 16 and the first clutch body 20, the shifting sleeve 16 moves into the engaged state, the shifting sleeve 16 being displaced in an accelerated movement towards the engaged state according to FIG. 7 due to the applied spring force.

A positive fit is thus produced between the shifting sleeve 16 and the first clutch body 20, which is formed by the first and the second toothing 18, 22. There is a first axial overlap $U_1$ between the first and the second toothing 18, 22 (see FIG. 8).

If a torque transmission takes place between the first clutch body 20 and the first shaft 12, this results in a force on the shifting sleeve 16 in the direction of the engaged state, i.e. towards the first clutch body 20, due to the wedge-shaped toothings 18, 22.

The force acting on the shifting sleeve 16 is largely dependent on the geometry of the undercuts 23, 25 and the torque present.

From a certain torque, the force acting on the shifting sleeve 16 increases such that the shifting sleeve 16 is thus moved relative to the armature 30 located at the stop 32 towards the first clutch body 20, so that the axial overlap of the first and the second toothing 18, 22 increases further until a second axial overlap $U_2$ is reached, which corresponds to a maximum axial overlap and exceeds the amount of the first axial overlap $U_1$.

Figure 9:
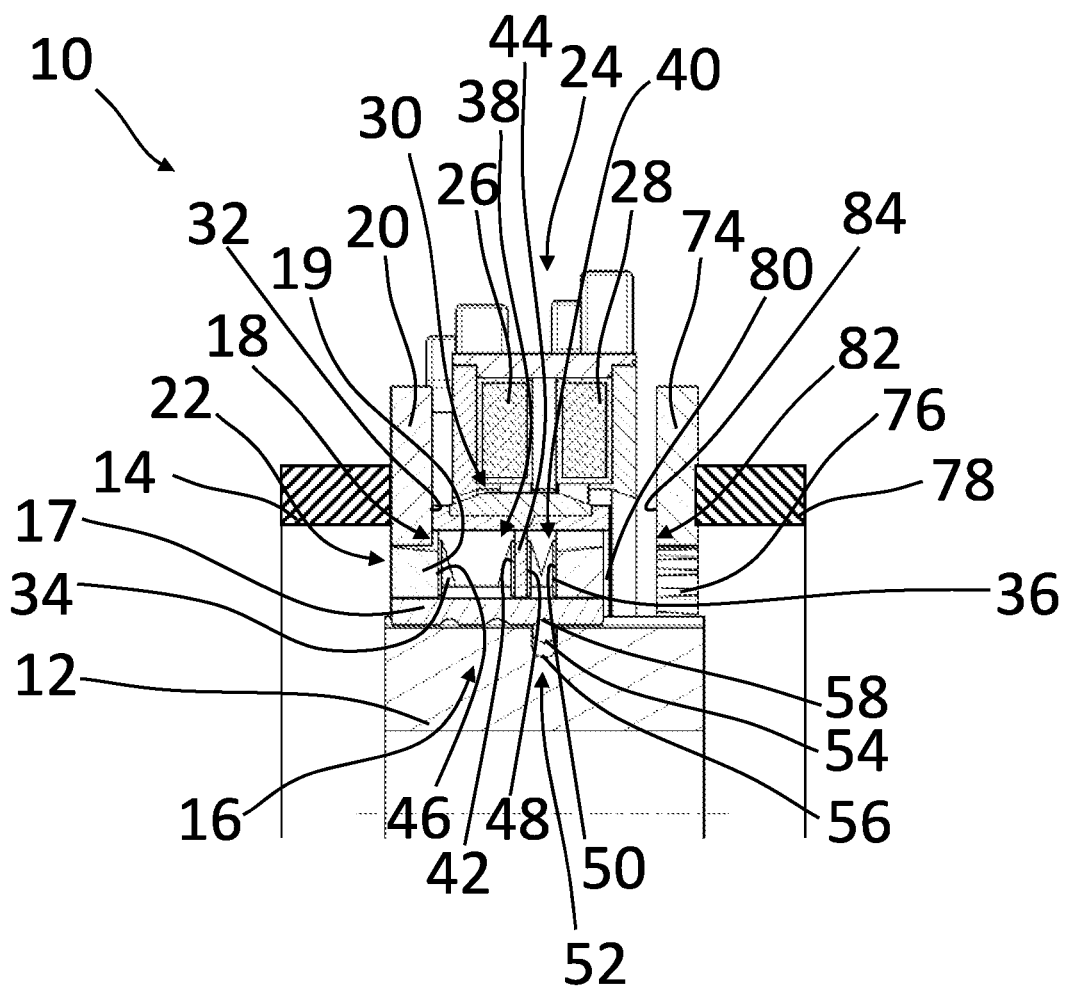
FIG. 9 shows the detail of the electromagnetic clutch of FIG. 3 with the shifting sleeve in the fully engaged state and with torque transmission.
Figure 10:
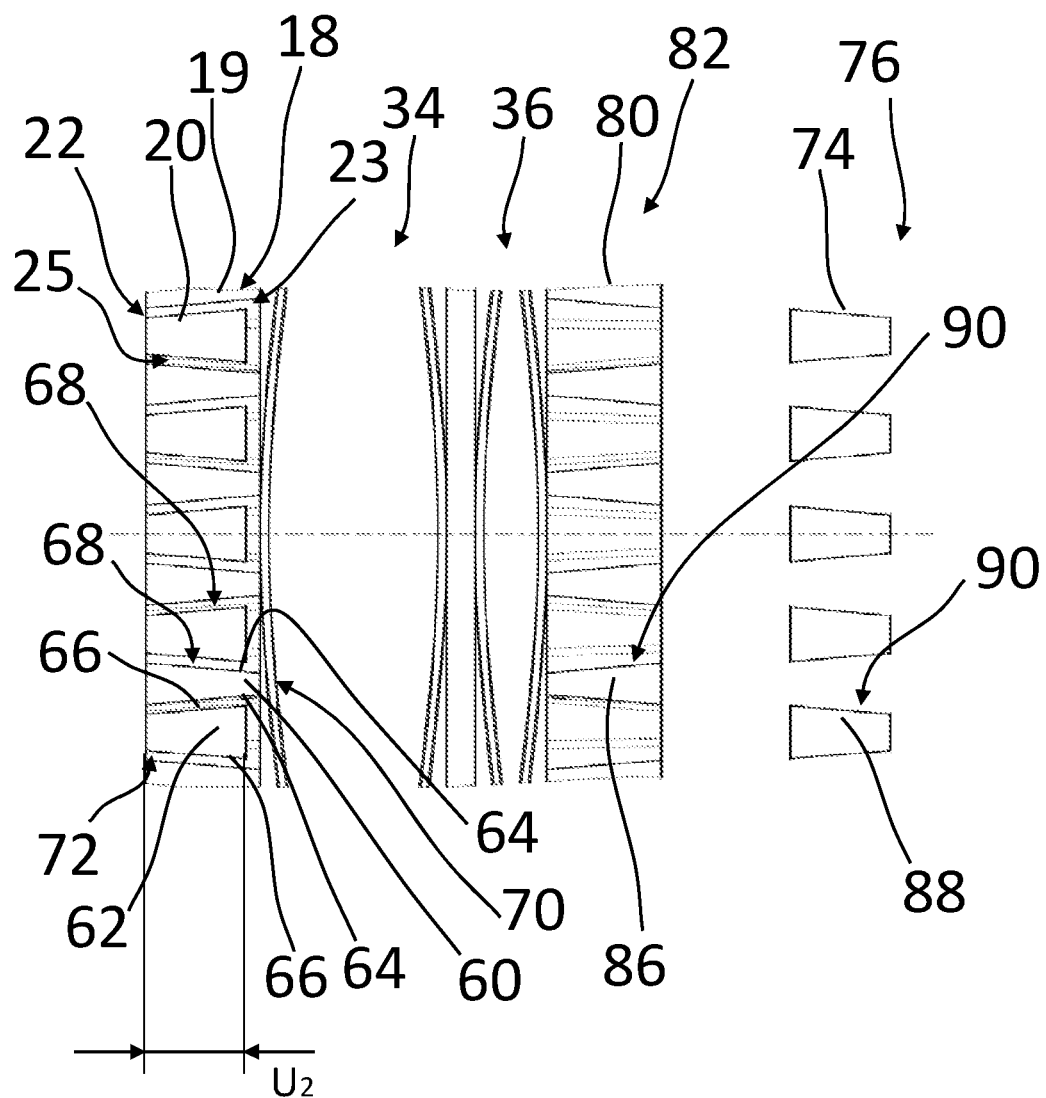
FIG. 10 shows a schematic representation of the toothings of FIG. 4 with the shifting sleeve in the fully engaged state and with torque transmission.

This state is shown in FIGS. 9 and 10.

Due to the relative movement between the shifting sleeve 16 and the armature 30, the space 38 increases in the axial direction, so that the elastic spring unit 34 first relaxes in the axial direction (provided that it was previously in a preloaded state). At the same time, the space 40 is reduced in the axial direction, as a result of which the second elastic spring unit 36 is compressed between the third axial abutment surface 48 of the web 44 and the fourth axial abutment surface 50 of the second toothed wheel 80.

Furthermore, as shown in FIG. 9, the spring detent 52 can also act in this state and exert a holding force on the shifting sleeve 16, since in this position, a further groove is provided on the inside of the shifting sleeve 16 into which the spring ring 56 can engage.

If the torque transmitted between the first clutch body 20 and the first shaft 12 is canceled or reduced, the shifting sleeve 16 is displaced away from the first clutch body 20, at least from a certain threshold value of the torque, due to the spring force acting on the shifting sleeve 16 by the strongly compressed second elastic spring unit 36, so that the first and the second toothing 18, 22 again assume the first axial overlap $U_1$, as shown in FIGS. 7 and 8.

If the shifting sleeve is now to be shifted back into the disengaged state, the magnetic force generated by the voltage applied to the first coil 26 must first be reduced or removed.

Furthermore, a voltage must be applied to the second coil 28, which exerts a magnetic force on the armature 30 which acts away from the first clutch body 20.

Figure 5:
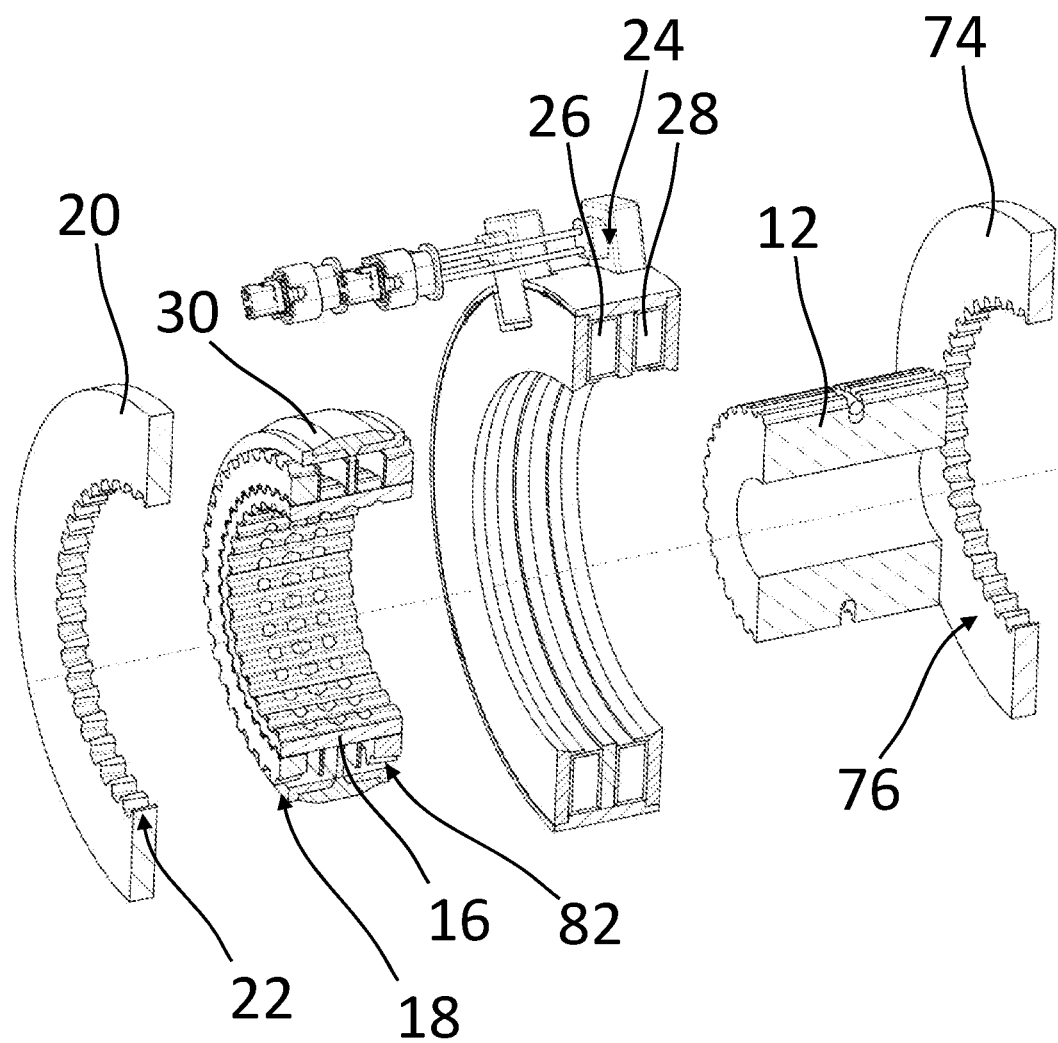
FIG. 5 shows a perspective exploded view of all relevant components of the electromagnetic clutch of FIG. 3.

This leads to a displacement of the armature 30, as a result of which the shifting sleeve 16 with the interposition of the first and the second elastic spring units 34, 36 is moved from the engaged state back into the disengaged state as shown in FIGS. 5 and 6.

In this state, the shifting sleeve can again be held in accordance with the above explanations by the spring detent 52 and/or via the armature 30 by energizing the first and the second coil 26, 28.

The invention claimed is:

1. An electromagnetic clutch, comprising:
  a shifting sleeve which has a first toothing, is arranged in a rotationally fixed manner on a first shaft and can be displaced linearly along the first shaft between an engaged and a disengaged state,
  a first clutch body, which has a second toothing and which is aligned coaxially to the first shaft,
  a stator, which includes a first coil, which serves for the direct or indirect displacement of the shifting sleeve linearly along the first shaft,
  wherein the first and/or the second toothing has/have undercuts in the direction of the engaged state, which are configured such that a torque transmission between the first shaft and the first clutch body generates a force on the shifting sleeve in the direction of the engaged state, and
  wherein, in the engaged state, there is a positive fit due to the first and the second toothing between the shifting sleeve and the first clutch body,
  wherein an armature is provided which is coupled to the shifting sleeve, and wherein the armature is adapted to be displaced along the first shaft by energizing the first coil, the armature and the shifting sleeve being coupled so as to be displaceable relative to each other in the axial direction, and
  wherein a displacement of the armature by the first coil is limited by a stop which is provided on the first clutch body, and wherein, when the armature rests against the stop when the first coil is energized, there is a magnetic holding force which acts on the armature.

2. The electromagnetic clutch according to claim 1, wherein the first coil serves for direct or indirect displacement of the shifting sleeve linearly along the first shaft into the engaged state, and wherein the stator comprises a second coil, which serves for direct or indirect displacement of the shifting sleeve linearly along the first shaft in the direction opposite to the engaged state and/or wherein a spring return is provided which applies a spring force to the shifting sleeve linearly along the first shaft in the direction opposite to the engaged state.

3. The electromagnetic clutch according to claim 1, wherein the first coil serves for direct or indirect displacement of the shifting sleeve linearly along the first shaft into the engaged state, and wherein a spring return is provided which applies a spring force to the shifting sleeve linearly along the first shaft in the direction opposite to the engaged state.

4. The electromagnetic clutch according to claim 1, wherein when the shifting sleeve is displaced by the first coil into the engaged state, there is an axial overlap between the first and the second toothing and the undercuts move the shifting sleeve towards the engaged state when torque is transmitted.

5. The electromagnetic clutch according to claim 1, wherein the first and/or the second toothing provided with undercuts has/have teeth, wherein tooth flanks of the teeth are wedge-shaped at least along a section of the tooth in a plan view.

6. The electromagnetic clutch according to claim 5, wherein the first and the second toothing have undercuts and tapered ends of the wedge-shaped sections of the first and the second toothing extend in opposite directions.

7. The electromagnetic clutch according to claim 1, wherein the armature and the shifting sleeve are coupled via at least a first spring unit which is elastic in the axial direction and which deflects when the shifting sleeve and the armature are displaced axially relative to each other.

8. The electromagnetic clutch according to claim 7, wherein the armature has a first axial abutment surface and the shifting sleeve has a second axial abutment surface, and wherein the first spring unit is supported in the axial direction on the first and the second axial abutment surfaces.

9. The electromagnetic clutch according to claim 8, wherein the armature has a radial web on which the first axial abutment surface is provided.

10. The electromagnetic clutch according to claim 9, wherein the first spring unit is present on an axial side of the web and a second spring unit is present on the opposite side of the web, at least one of the spring units exerting a restoring force when the armature and the shifting sleeve are displaced relative to each other.

11. The electromagnetic clutch according to claim 10, wherein the spring units are accommodated in spaces which are delimited radially on the inside by a shifting sleeve bushing and radially on the outside by the armature and on one end face by the web and on the opposite end face by a toothed wheel firmly connected to the shifting sleeve bushing, wherein the toothed wheel has the first toothing and engages in the second toothing provided on the first clutch body in the engaged state.

12. The electromagnetic clutch according to claim 7, wherein the at least one spring unit comprises at least one wave ring or a diaphragm spring or an assembly with at least one wave ring and a diaphragm spring.

13. The electromagnetic clutch according to claim 7, wherein at least one spring unit is arranged such that, when the shifting sleeve is coupled to the first clutch body, this spring unit is preloaded to exert a spring force on the shifting sleeve in the direction of the disengaged state.

14. The electromagnetic clutch according to claim 1, wherein at least one spring unit is arranged such that when the first and the second toothing are in contact on an end face and the shifting sleeve is not yet coupled to the first clutch body, the spring unit pretensions the shifting sleeve in the direction of the engaged state.

15. The electromagnetic clutch according to claim 1, wherein a second clutch body is provided, which is aligned coaxially to the first shaft and is provided on the axial side of the shifting sleeve opposite to the first clutch body and can be coupled to the shifting sleeve by actuating a second coil, which serves for direct or indirect displacement of the shifting sleeve linearly along the first shaft in the direction opposite to the engaged state, wherein a toothing of the second clutch body and a toothing of the shifting sleeve associated with the toothing of the second clutch body are formed like the toothing of the first clutch body and the toothing associated with the toothing of the first clutch body.

16. The electromagnetic clutch according to claim 15, wherein, when the shifting sleeve is moved into the engaged state along with the second clutch body, a spring unit acts on the shifting sleeve before and after the engagement in the direction of the engaged state or the disengaged state.

17. An electromagnetic clutch, comprising:
a shifting sleeve which has a first toothing, is arranged in a rotationally fixed manner on a first shaft and can be displaced linearly along the first shaft between an engaged and a disengaged state,
a first clutch body, which has a second toothing and which is aligned coaxially to the first shaft,
a stator, which includes a first coil, which serves for the direct or indirect displacement of the shifting sleeve linearly along the first shaft,
wherein the first and/or the second toothing has/have undercuts in the direction of the engaged state, which are configured such that a torque transmission between the first shaft and the first clutch body generates a force on the shifting sleeve in the direction of the engaged state, and
wherein, in the engaged state, there is a positive fit due to the first and the second toothing between the shifting sleeve and the first clutch body,
wherein an armature is provided which is coupled to the shifting sleeve, and wherein the armature is adapted to be displaced along the first shaft by energizing the first coil, the armature and the shifting sleeve being coupled so as to be displaceable relative to each other in the axial direction,
wherein the armature and the shifting sleeve are coupled via at least a first spring unit which is elastic in the axial direction and which deflects when the shifting sleeve and the armature are displaced axially relative to each other, and
wherein at least one spring unit is arranged such that, when the shifting sleeve is not yet coupled to the first clutch body, this spring unit is preloaded to exert a spring force on the shifting sleeve in the direction of the engaged state.

18. A method of closing and opening an electromagnetic clutch, including an armature and a shifting sleeve coupled thereto, which has a first toothing, is arranged in a rotationally fixed manner on a first shaft and can be displaced linearly along the first shaft between an engaged and a disengaged state, a first clutch body having a second toothing, which is aligned coaxially to the first shaft, a first coil, which serves to displace the shifting sleeve linearly along the first shaft into the engaged state, and a second coil, which serves to displace the shifting sleeve linearly along the first shaft against the engaged state, the method comprising:

a) applying voltage to the first coil and generating a magnetic force acting on the armature towards the first clutch body;

b) displacing the armature and entraining the shifting sleeve by the armature from a disengaged state in the direction of the engaged state with the interposition of a spring unit between the armature and the shifting sleeve;

c) moving the shifting sleeve into the engaged state of the shifting sleeve and forming a positive fit between the shifting sleeve and the first clutch body by the first and the second toothing, the first and the second toothing having a first axial overlap with respect to each other;

d) transmitting a torque between the first clutch body and the first shaft and displacing the shifting sleeve relative to the armature towards the first clutch body, the first and the second toothing having a second axial overlap with respect to each other, which exceeds the amount of the first one;

e) canceling or reducing the transmitted torque between the first clutch body and the first shaft and displacing the shifting sleeve relative to the armature away from the first clutch body, the first and the second toothing having the first axial overlap with respect to each other;

f) canceling or reducing the magnetic force acting on the armature by the first coil;

g) applying voltage to the second coil and generating a magnetic force acting on the armature; and h) displacing the armature and entraining the shifting sleeve by means of the armature from an engaged state to the disengaged state.

* * * * *